United States Patent
Park et al.

(10) Patent No.: US 9,876,805 B2
(45) Date of Patent: Jan. 23, 2018

(54) APPARATUS AND METHOD FOR TRANSMITTING AND RECEIVING MESSAGES

(71) Applicant: SAMSUNG SDS CO., LTD., Seoul (KR)

(72) Inventors: Byung-Jae Park, Yangju-si (KR); Myoung-Kyhun Choi, Seoul (KR); Min-Jeong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 270 days.

(21) Appl. No.: 14/452,613

(22) Filed: Aug. 6, 2014

(65) Prior Publication Data
US 2015/0047027 A1 Feb. 12, 2015

(30) Foreign Application Priority Data
Aug. 7, 2013 (KR) .................. 10-2013-0093748

(51) Int. Cl.
*H04L 29/06* (2006.01)

(52) U.S. Cl.
CPC ................. *H04L 63/1416* (2013.01)

(58) Field of Classification Search
CPC ............................................. H04L 63/1416
See application file for complete search history.

(56) References Cited

U.S. PATENT DOCUMENTS

| | | | |
|---|---|---|---|
| 7,796,602 B2 * | 9/2010 | Guo | H04L 47/10 370/394 |
| 2002/0078315 A1 * | 6/2002 | Howard | G06F 11/2064 711/162 |
| 2007/0083923 A1 * | 4/2007 | Fluhrer | H04L 63/1466 726/12 |
| 2007/0230493 A1 * | 10/2007 | Dravida | H04L 47/14 370/412 |
| 2009/0158417 A1 * | 6/2009 | Khanna | H04L 63/1466 726/12 |
| 2012/0188952 A1 * | 7/2012 | Baldemair | H04L 1/1822 370/329 |

* cited by examiner

*Primary Examiner* — Ghodrat Jamshidi
(74) *Attorney, Agent, or Firm* — Sughrue Mion, PLLC (57) ABSTRACT

A message reception apparatus includes a reception module configured to receive a message transmitted from a message transmission apparatus, a determination module configured to compare a serial number of the received message with a serial number stored in a serial number management buffer, and to classify the received message as a normal message or an abnormal message based on a result of the comparison, and a processing module configured to process the normal message.

16 Claims, 4 Drawing Sheets

|     |    |    |    |    |    |    |    |    |
|-----|----|----|----|----|----|----|----|----|
| (a) | 11 | 12 | 14 | 13 | 16 | 15 | 17 | 18 |

|     |    |    |    |    |    |    |    |    |
|-----|----|----|----|----|----|----|----|----|
| (b) | 19 | 12 | 14 | 13 | 16 | 15 | 17 | 18 |

APPARATUS AND METHOD FOR TRANSMITTING AND RECEIVING MESSAGES

CROSS-REFERENCE TO RELATED APPLICATION

This application claims priority to and the benefit of Korean Patent Application No. 2013-0093748, filed on Aug. 7, 2013, the disclosure of which is incorporated herein by reference in its entirety.

BACKGROUND

1. Field

Exemplary embodiments of the present disclosure relate to data transmission and reception technology between terminals.

2. Discussion of Related Art

When two terminals transmit and receive data between each other over a network, each terminal splits the data to be transmitted into a plurality of pieces and transmits the split data to the other terminal. However, since the network environment for connecting the terminals changes in real time, messages may arrive out of order or some of the messages may be lost. Further, a replay attack may occur when a malicious third party on the network intercepts data and transmits the data several times to a reception terminal.

To solve the problem, each terminal transmits pieces of data after assigning serial numbers to the respective pieces of data to specify the processing order of the transmitted data. Accordingly, the reception terminal is configured to determine the order of each received message according to the serial number of the message or determine whether the message has already been received. However, such a conventional scheme for transmitting messages involves simply discarding a message that has a serial number smaller than that of a lastly received message and unconditionally receiving a message that has a serial number greater than the lastly received message. Accordingly, the conventional message transmission scheme suffers from an unnecessarily high message retransmission ratio, and has a limited capability of protecting against replay attacks.

SUMMARY

Exemplary embodiments of the present disclosure are directed to an apparatus and method for transmitting and receiving a message in which a change in the order of received messages or a replay attack by a third party can be effectively coped with when messages are transmitted and received between network devices.

According to an exemplary embodiment, there is provided a message reception apparatus, including: a reception module configured to receive a message transmitted from a message transmission apparatus; a determination module configured to compare a serial number of the received message with a serial number stored in a serial number management buffer, and to classify the received message as a normal message or an abnormal message based on a result of the comparison; and a processing module configured to process the normal message.

A size of the serial number management buffer may be determined based on a total number of messages communicated between the message transmission apparatus and the message reception apparatus per unit time.

The size of the serial number management buffer may be set as a larger value of a predetermined minimum buffer size and an amount of data communicated between the message transmission apparatus and the message reception apparatus per second (TPS: transactions per second).

The determination module may classify the received message as the normal message when the serial number management buffer does not have stored therein a serial number identical to the serial number of the received message and the serial number of the received message falls within a serial number allowance range calculated from serial numbers stored in the serial number management buffer.

When the serial number management buffer has an empty entry upon the reception of the message, a minimum value and a maximum value of the serial number allowance range may be determined by the following equations:

the minimum value=a minimum serial number in the serial number management buffer−a minimum value allowance range; and the maximum value=a maximum serial number in the serial number management buffer+a total number of empty entries in the serial number management buffer+a maximum value allowance range.

The determination module may store the serial number of the received message in one of the empty entries of the serial number management buffer when the received message is classified as the normal message.

When the serial number management buffer has no empty entry upon the reception of the message, a minimum value and a maximum value of the serial number allowance range may be determined by the following equations:

the minimum value=a minimum serial number in the serial number management buffer; and the maximum value=a maximum serial number in the serial number management buffer+a maximum value allowance range.

The determination module may replace one of the serial numbers stored in the serial number management buffer with the serial number of the received message when the received message is classified as the normal message.

The determination module may replace a smallest serial number among the serial numbers stored in the serial number management buffer with the serial number of the received message.

The determination module may transmit an error message to the message transmission apparatus when the serial number management buffer has stored therein a serial number identical to the serial number of the received message or the serial number of the received message falls outside the serial number allowance range calculated from the serial numbers stored in the serial number management buffer.

According to another exemplary embodiment, there is provided a message reception method, including: receiving, by a reception module, a message transmitted from a message transmission apparatus; comparing, by a determination module, a serial number of the received message with a serial number stored in a serial number management buffer; classifying, by the determination module, the received message as a normal message or an abnormal message based on a result of the comparison; and processing, by a processing module, the normal message.

The classifying of the received message may include classifying the received message as the normal message when the serial number management buffer does not have stored therein a serial number identical to the serial number of the received message and the serial number of the received message falls within a serial number allowance range calculated from serial numbers stored in the serial number management buffer.

When the serial number management buffer has an empty entry upon the reception of the message, a minimum value and a maximum value of the serial number allowance range may be determined by the following equations:

the minimum value=a minimum serial number in the serial number management buffer−a minimum value allowance range; and the maximum value=a maximum serial number in the serial number management buffer+a total number of empty entries in the serial number management buffer+a maximum value allowance range.

The classifying of the received message may further include storing the serial number of the received message in one of the empty entries of the serial number management buffer when the received message is classified as the normal message.

When the serial number management buffer has no empty entry upon the reception of the message, a minimum value and a maximum value of the serial number allowance range may be determined by the following equations:

the minimum value=a minimum serial number in the serial number management buffer; and the maximum value=a maximum serial number in the serial number management buffer+a maximum value allowance range.

The classifying of the received message may further include replacing one of the serial numbers stored in the serial number management buffer with the serial number of the received message when the received message is classified as the normal message.

The classifying of the received message may further include replacing a smallest serial number among the serial numbers stored in the serial number management buffer with the serial number of the received message.

The classifying of the received message may further include transmitting an error message to the message transmission apparatus when the serial number management buffer has stored therein a serial number identical to the serial number stored in the serial number management buffer or the serial number of the received message falls outside the serial number allowance range calculated from the serial numbers stored in the serial number management buffer.

BRIEF DESCRIPTION OF THE DRAWINGS

The above and other objects, features and advantages of the present disclosure will become more apparent to those familiar with this field from the following detailed description when taken in conjunction with the accompanying drawings, in which.

DETAILED DESCRIPTION OF EXEMPLARY EMBODIMENTS

Hereinafter, exemplary embodiments of the present disclosure will be described with reference to accompanying drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those familiar with this field.

Figure 1:
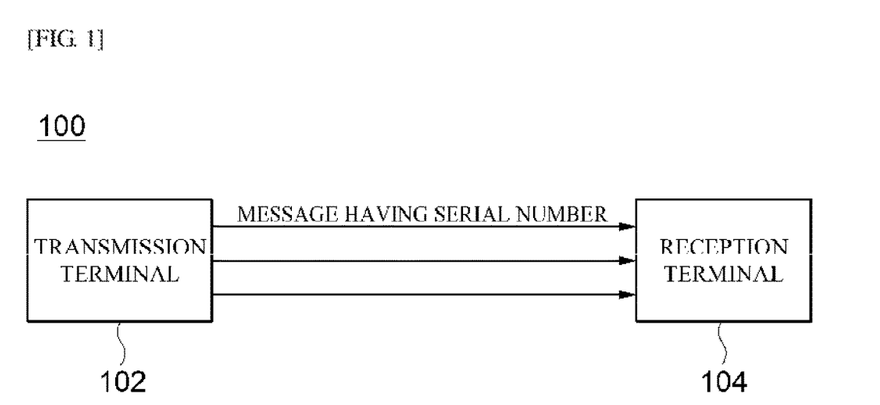
FIG. 1 is a block diagram for describing a message transmission and reception system 100 according to an embodiment of the present disclosure.

FIG. 1 is a block diagram for describing a message transmission and reception system 100 according to an embodiment of the present disclosure. As shown, the message transmission and reception system 100 according to an embodiment of the present disclosure may include a transmission terminal 102 and a reception terminal 104.

The transmission terminal 102 may transmit one or more messages to the reception terminal 104 through a network (not shown). For example, the message may be a packet or datagram, which is a basic message transmission unit in transfer control protocol/internet protocol (TCP/IP) communication. However, embodiments of the present disclosure are not limited to a specific message transmission protocol. That is, the message may be a basic unit of data transmission prescribed between the transmission terminal 102 and the reception terminal 104.

The transmission terminal 102 may be configured to give a serial number to each of the one or more messages and transmit the messages to the reception terminal 104. Such serial numbers may be used to identify the respective messages received in the reception terminal 104 or determine the processing order of the messages received in the reception terminal 104. Each serial number may be incorporated into a header of the respective message.

When the transmission terminal 102 receives a request for a retransmission of at least a portion of previously received messages from the reception terminal 104, the transmission terminal 102 may retransmit the requested message to the reception terminal 104. According to an embodiment of the present disclosure, the transmission terminal 102 may retransmit a previously transmitted message as it is, or retransmit the previously transmitted message after updating a serial number of the previously transmitted message as a new serial number, as will be described in detail below.

The reception terminal 104 may receive messages from the transmission terminal 102 through the network, and process the received messages. As described above, each of the messages received from the transmission terminal 102 may include a serial number, and in this case, the reception terminal 104 may sequentially process the messages according to the serial numbers of the received messages. In an embodiment of the present disclosure, "processing" of a message may include, but is not limited to, general operations performed to process the message on a message reception end, for example, an operation of storing the message in a data storage medium in the reception terminal 104, an operation of converting the stored message into a format required by a specific application in the reception terminal 104, and so forth.

In an embodiment of the present disclosure, the reception terminal 104 may generate and manage a serial number management buffer to manage the serial numbers of the received messages. The serial number management buffer may be a buffer for storing a serial number of a message which is recently received at the reception terminal 104.

In an embodiment of the present disclosure, a size of the serial number management buffer, i.e., the number of serial number entries in the serial number management buffer, may be determined based on the number of messages communicated, per unit time, between the transmission terminal 102 and the reception terminal 104. Specifically, the size of the serial number management buffer may be determined as follows:

$$\text{Size of serial number management buffer} = \max(N, N_{min})$$

Here, N may be a value obtained by rounding up a value of the amount of data communicated per second (TPS: transactions per second) between the transmission terminal 102 and the reception terminal 104, and may be represented by an integer equal to or greater than 0. For example, an actual measured TPS value may be 0.1, 0.2, or 0.9, which, in any case, would result in the value of N being 1. Further, $N_{min}$ may be a basic size of the serial number management buffer, and may be determined by considering various factors such as a network status, a message type, a protocol in use, etc.

The reception terminal 104 may store the serial numbers of the received messages in the serial number management buffer, and determine a newly received message as an abnormal message when a serial number of the message is the same as a serial number stored in the serial number management buffer or falls outside a serial number allowance range calculated from the serial numbers stored in the serial number management buffer. Therefore, an embodiment of the present disclosure may provide an effective way of avoiding a replay attack in which, for example, a malicious third party intercepts a message between the transmission terminal 102 and the reception terminal 104 and repeatedly transmits the message to the reception terminal 104. An exemplary process of receiving messages using the serial number management buffer will be described in detail below.

In an embodiment of the present disclosure, according to what function a terminal performs, the terminal may be referred to as the transmission terminal 102 or as the reception terminal 104. That is, in a network communication process between the terminals, a terminal transmitting the message at a specific time may be referred to as the transmission terminal 102 while a terminal receiving the message may be referred to as the reception terminal 104. In this case, when the reception terminal 104 transmits a new message (for example, a response message to a previous message) to the transmission terminal 102, the reception terminal 104 and the transmission terminal 102 may be now referred to as a transmission terminal and a reception terminal, respectively.

Figure 2:
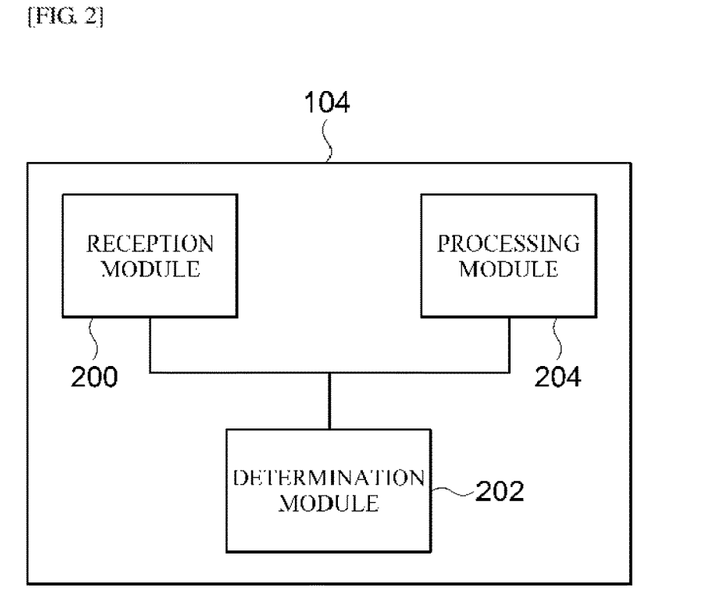
FIG. 2 illustrates a detailed diagram of a reception terminal 104 according to an embodiment of the present disclosure.

FIG. 2 illustrates a detailed diagram of a reception terminal 104 according to an embodiment of the present disclosure. As shown, the reception terminal 104 according to an embodiment of the present disclosure may include a reception module 200, a determination module 202, and a processing module 204.

The reception module 200 may receive a message transmitted from the transmission terminal 102. To this end, the reception module 200 may include a network connection means suitable for a type of network used by the reception terminal 104, and hardware and software suitable for data transmission and reception in the network.

Further, the determination module 202 may generate and manage the serial number management buffer, compare a serial number of the message received through the reception module 200 with a serial number which is previously stored in the serial number management buffer, and classify the received message as a normal message or an abnormal message based on a result of the comparison.

Specifically, the determination module 202 may determine the received message to be a normal message, i.e., a message which is received normally, when: the serial number of the received message:

1) is not the same as any of the serial numbers stored previously in the serial number management buffer; and
2) falls within a serial number allowance range calculated from the serial numbers stored previously in the serial number management buffer.

When the received message is determined to be a message which is received normally, the determination module 202 may store the serial number of the received message in the serial number management buffer. In this case, when there are one or more empty entries in the serial number management buffer, the serial number of the newly received message may be stored in one of the one or more empty entries. However, when there is no empty entry in the serial number management buffer, a serial number of the newly received message may replace one of the previously stored serial numbers. For example, the serial number of the newly received message may be stored in the serial number management buffer to replace the smallest number among the previously stored serial numbers.

On the other hand, when the received message is determined to be an abnormal message, in other words, when the received message is the same as a serial number stored previously in the serial number management buffer or falls outside the serial number allowance range calculated from the serial numbers stored previously in the serial number management buffer, the determination module 202 may transmit an error message to the transmission terminal 102. The error message may be one of the following.

An error message of too old a serial number (an error message of "too old"): this type of error message is transmitted when the serial number of a received message is smaller than a minimum value of the serial number allowance range. In this case, since the reception terminal 104 cannot determine whether the received message is a normal message which has arrived late or a message which has been previously processed but is retransmitted, the transmission terminal 102 may transmit an error message of "too old." The transmission terminal 102 receiving the error message may update the serial number as a newest number and retransmit the message having the updated serial number.

An error message of an identical serial number (an error message of "duplicated"): this type of error message is transmitted when the serial number management buffer already has a serial number identical to the serial number of a received message. When the error message is transmitted to the transmission terminal 102, the transmission terminal 102 may update the serial number as a newest number and retransmit the message having the updated serial number.

An error message of too advanced a serial number (an error message of "too advanced"): this type of error message is transmitted when the serial number of a received message is greater than a maximum value of the serial number allowance range. In this case, the reception terminal 104 cannot determine whether the received message is a normal message to be processed or a falsified message. When the error message is transmitted to the transmitting terminal 102, the transmission terminal 102 may update the serial number as a newest number or maintain the serial number as it is, and retransmit the message having the updated or maintained serial number.

The serial number allowance range, which is used by the determination module 202 as a reference for determining whether the message is normal or not, may be calculated as follows.

First, when a new message is received and the serial number management has one or more empty entries (for example, when terminals perform initial communications), a minimum value and a maximum value of the serial number allowance range may be determined as follows.

Minimum value=a minimum serial number in the serial number management buffer−a minimum value allowance range Maximum value=a maximum serial number in the serial number management buffer+the number of empty entries in the serial number management buffer+a maximum value allowance range In the above equations, the minimum value allowance range and the maximum value allowance range may be based on, e.g., network transmission delay between the transmission terminal 102 and the reception terminal 104, and, according to exemplary embodiments, may be the same as the above-mentioned value N or specified as another value.

When the serial number management buffer has no empty entry upon the reception of the message, the minimum value and the maximum value of the serial number allowance range may be determined as follows.

Minimum value=the minimum serial number in the serial number management buffer

Maximum value=the maximum serial number in the serial number management buffer+the maximum value allowance range That is, in this case, the minimum value allowance range may not be used.

Finally, the processing module 204 may process the message determined as a normally received message. The processing module 204 may perform a message process operation as discussed above.

Figure 3A:
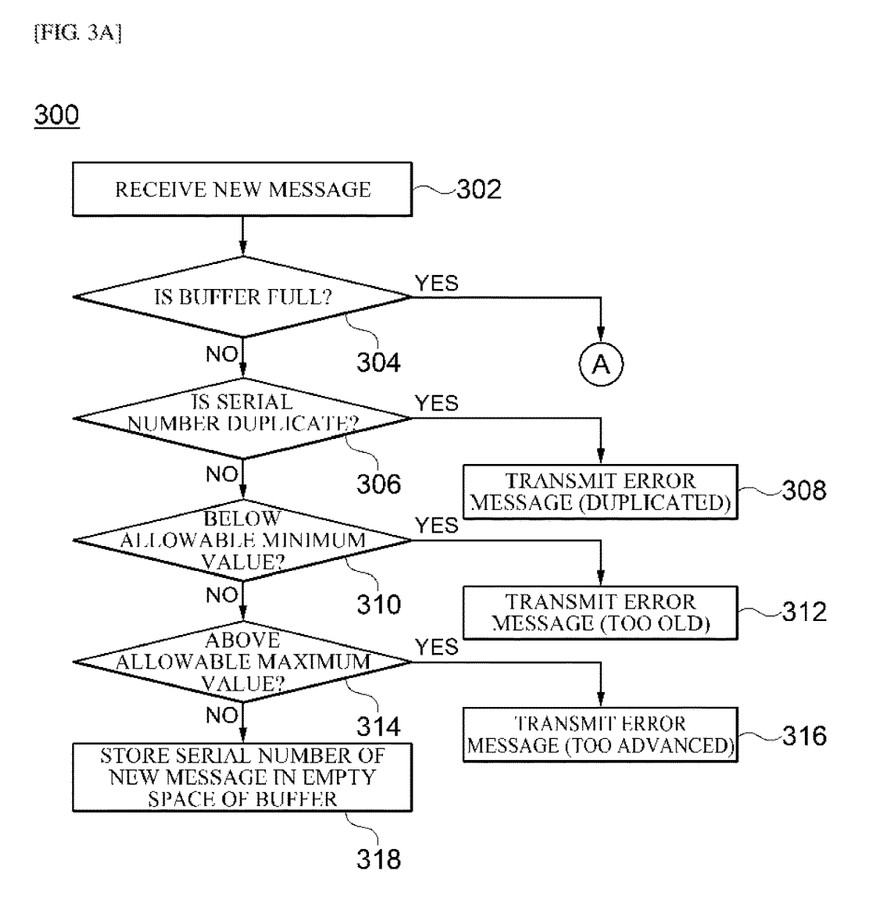
FIGS. 3A and 3B are flowcharts for describing a message reception method 300 according to an embodiment of the present disclosure.
Figure 3B:
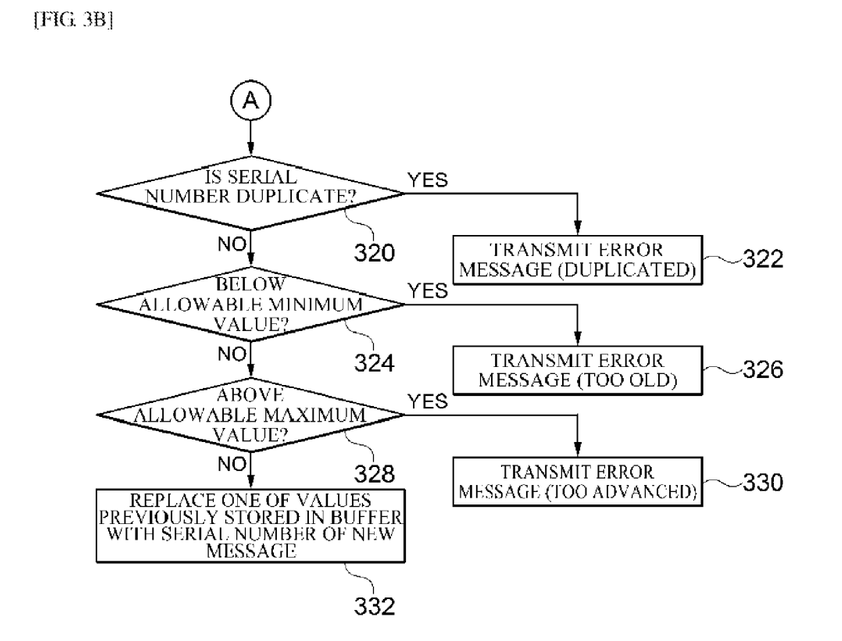

FIGS. 3A and 3B are flowcharts for describing a message reception method 300 according to an embodiment of the present disclosure.

First, when the reception module 200 receives a new message from the transmission terminal 102, the determination module 202 may determine whether the serial number management buffer is full at the time of the reception of the new message (operation 304).

When it is determined in operation 304 that there are one or more empty entries in the serial number management buffer, the determination module 202 may then determine whether the serial number of the new message is the same as one of the serial numbers stored in the serial number management buffer (operation 306). When it is determined in operation 306 that the serial number management buffer has stored therein a serial number identical to the serial number of the new message, the determination module 202 may transmit an error message of "duplicated" and discard the received message (operation 308).

On the other hand, when it is determined in operation 306 that the serial number management buffer does not have stored therein a serial number identical to the serial number of the new message, the determination module 202 may then determine whether the serial number of the new message is smaller than the minimum value of the calculated serial number allowance range (hereinafter, referred to as the "allowable minimum value") (operation 310). As described above, the minimum value may be calculated as follows.

Minimum value=the minimum serial number in the serial number management buffer−the minimum value allowance range When it is determined in operation 310 that the serial number of the new message is smaller than the allowable minimum value, the determination module 202 may transmit the error message of "too old" to the transmission terminal 102, and discard the received message (operation 312). On the other hand, when it is determined in operation 310 that the serial number of the new message is greater than or equal to the allowable minimum value, the determination module 202 may then determine whether the serial number of the new message is greater than the maximum value of the calculated serial number allowance range (hereinafter, referred to as the "allowable maximum value") (operation 314). As described above, the maximum value may be calculated as follows.

Maximum value=the maximum serial number in the serial number management buffer+the number of empty entries in the serial number management buffer+the maximum value allowance range When it is determined in operation 314 that the serial number of the new message is greater than the allowable maximum value, the determination module 202 may transmit the error message of "too advanced" to the transmission terminal 102, and discard the received message (operation 316). On the other hand, when it is determined in operation 314 that the serial number of the new message is less than or equal to the allowable maximum value, the determination module 202 may store the serial number of the new message in an empty entry of the serial number management buffer (operation 318).

Meanwhile, when it is determined in operation 304 that there is no empty entry in the serial number management buffer (buffer full), the determination module 202 may determine whether the serial number of the new message is the same as one of the serial numbers stored in the serial number management buffer (operation 320). When it is determined in operation 320 that the serial number of the new message is the same as a serial number stored in the serial number management buffer, the determination module 202 may transmit the error message of "duplicated" to the transmission terminal 102 and discard the received message (operation 322).

On the other hand, when it is determined in operation 320 that the serial number of the new message is not the same as any of the serial numbers stored in the serial number management buffer, the determination module 202 may then determine whether the serial number of the new message is smaller than the minimum value among the serial numbers stored in the serial number management buffer (operation 324). When it is determined in operation 324 that the serial number of the new message is smaller than the minimum value among the previously stored serial numbers, the determination module 202 may transmit the error message of "too old" to the transmission terminal 102, and discard the received message (operation 326). On the other hand, when it is determined in operation 324 that the serial number of the new message is greater than or equal to the minimum value among the previously stored serial numbers, the determination module 202 may then determine whether the serial number of the new message is greater than the allowable maximum value (i.e., the maximum value of the calculated serial number allowance range) (operation 328). As described above, the maximum value may be calculated as follows.

Maximum value=the maximum serial number in the serial number management buffer+the maximum value allowance range When it is determined in operation 328 that the serial number of the new message is greater than the allowable maximum value, the determination module 202 may transmit the error message of "too advanced" to the transmission terminal 102, and discard the received message (operation 330). On the other hand, when it is determined in operation 314 that the serial number of the new message is less than or equal to the allowable maximum value, the determination module 202 may replace one of the serial numbers stored in the serial number management buffer with the serial number of the new message (operation 332).

Figure 4:
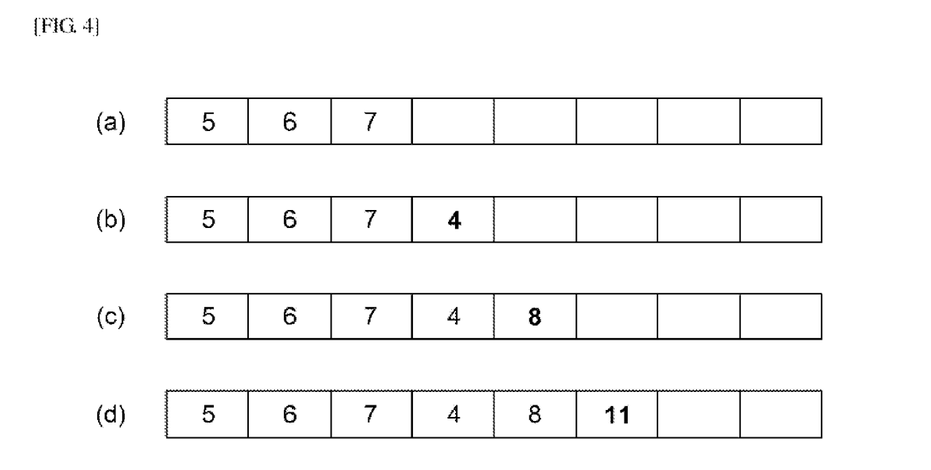
FIGS. 4 and 5 illustrate operations of determining whether a message is normal and managing a serial number management buffer according to an embodiment of the present disclosure.
Figure 5:
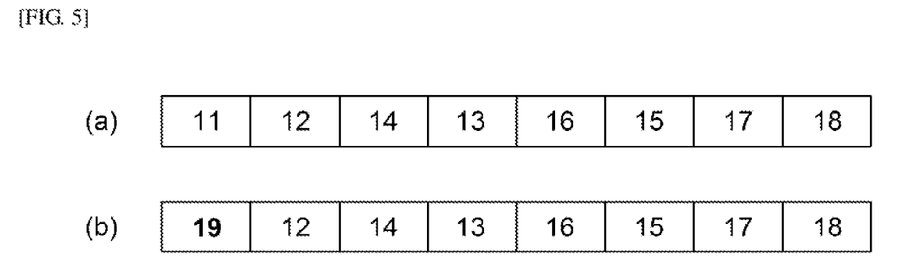

FIGS. 4 and 5 illustrate operations of determining whether a message is normal and managing a serial number management buffer according to an embodiment of the present disclosure. FIG. 4 illustrates an example in which there are one or more empty entries in the serial number management buffer and FIG. 5 illustrates an example in which the serial number management buffer is full. In these examples, it is assumed that the amount of data communicated between terminals over one second is 0.1 (that is, N=1), a basic size of the serial number management buffer ($N_{min}$) is 8, a size of the serial number management buffer is max(1, 8)=8, and each of the maximum and minimum value allowance ranges is 1.

First, as an embodiment shown in FIG. 4, it is assumed that three serial numbers "5", "6", and "7" are stored in the serial number management buffer (see (a) of FIG. 4), and the serial numbers of subsequently received messages are "6", "1", "4", "8", "13", and "1" in sequence. In this case, the serial numbers of the messages may be treated as follows.
  The serial number "6" is the same as a serial number previously stored in the serial number management buffer.
  The serial number "1" is too old since the serial number has a value smaller than 4, i.e., the value obtained by subtracting the minimum value allowance range (i.e., 1) from the minimum value in the serial number management buffer (i.e., 5).
  The serial number "4" may be stored in an empty entry of the serial number management buffer (see (b) of FIG. 4) since the serial number has a value equal to 4, i.e., the value obtained by subtracting the minimum value allowance range (i.e., 1) from the minimum value in the serial number management buffer (i.e., 5).
  The serial number "8" may be stored in an empty entry of the serial number management buffer (see (c) of FIG. 4) since the serial number has a value smaller 12, i.e., the value obtained by adding: the maximum value in the serial number management buffer (i.e., 7); the number of empty entries in the serial number management buffer (i.e., 4); and the maximum value allowance range (i.e., 1).
  The serial number "13" is too advanced since the serial number has a value greater than 12, i.e., the value obtained by adding: the maximum value in the serial number management buffer (i.e., 8); the number of empty entries in the serial number management buffer (i.e., 3); and the maximum value allowance range (i.e., 1).
  The serial number "11" may be stored in an empty entry of the serial number management buffer (see (d) of FIG. 4) since the serial number has a value smaller than 12, i.e., the value obtained by adding: the maximum value in the serial number management buffer (i.e., 8), the number of empty entries in the serial number management buffer (i.e., 3); and the maximum value allowance range (i.e., 1).

Next, as an embodiment shown in FIG. 5, it is assumed that eight serial numbers "11", "12", "14", "13", "16", "15", "17", and "18" are stored in the serial number management buffer (see (a) of FIG. 5), and the serial numbers of subsequently received messages are "8", "10", "12", "19", and "23" in sequence. In this case, the serial numbers of the messages may be treated as follows.
  The serial number "8" is too old since the serial number has a value smaller than the minimum value in the serial number management buffer.
  The serial number "10" is too old since the serial number has a value smaller than the minimum value in the serial number management buffer.
  The serial number "12" is the same as a serial number previously stored in the serial number management buffer.
  The serial number "19" is equal to the value obtained by adding the maximum value in the serial number management buffer (i.e., 18) and the maximum value allowance range (i.e., 1), and therefore may replace the smallest serial number in the serial number management buffer (i.e., 11) (see (b) of FIG. 5).
  The serial number "23" is too advanced since the serial number 23 has a value greater than 19, i.e., the value obtained by adding the maximum value in the serial number management buffer (i.e., 18) and the maximum value allowance range (i.e., 1).

In embodiments of the present disclosure, a serial number management buffer for managing a serial number of a recently received message may be advantageously used in cases where messages are received out of order, some messages arrive too late, or an identical message is received again.

Meanwhile, an exemplary embodiment of the present disclosure can include a computer-readable storage medium including a program for performing the methods described herein on a computer. The computer-readable storage medium may separately include program commands, local data files, local data structures, etc. or include a combination of them. The computer-readable storage medium may be specially designed and configured for the present disclosure, or known and available to those of ordinary skill in the field of computer software. Examples of the computer-readable storage medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers.

It will be apparent to those familiar with this field that various modifications can be made to the above-described exemplary embodiments of the present disclosure without departing from the spirit or scope of the disclosure. Thus, it is intended that the present disclosure cover all such modifications provided they come within the scope of the appended claims and their equivalents.

What is claimed is:

1. A packet reception apparatus, comprising:
at least one hardware processor; and
at least one memory storing instructions executed by the processor,
wherein the processor is configured to:
receive a packet transmitted from a packet transmission apparatus through a network;
determine whether a serial number management buffer is full upon reception of the packet;
classify the received packet as a normal packet when the serial number management buffer does not have stored therein a serial number identical to a serial number of the received packet and the serial number of the received packet falls within a serial number allowance range; and
process the normal packet;
wherein the serial number allowance range is calculated from a total number of empty entries in the serial number management buffer, and minimum and maximum serial numbers stored in the serial number management buffer based on a result of the determination and includes a serial number which exceeds a maximum serial number in the serial number management buffer, and
wherein, a size of the serial number allowance range is changed based on the total number of empty entries in the serial number management buffer.

2. The packet reception apparatus of claim 1, wherein a size of the serial number management buffer is determined based on a total number of packets communicated between the packet transmission apparatus and the packet reception apparatus per unit time.

3. The packet reception apparatus of claim 2, wherein the size of the serial number management buffer is set as a larger value of a predetermined minimum buffer size and an amount of data communicated between the packet transmission apparatus and the packet reception apparatus per second (TPS: transactions per second).

4. The packet reception apparatus of claim 1, wherein, when the serial number management buffer has an empty entry upon the reception of the packet, a minimum value and a maximum value of the serial number allowance range are determined by the following equations:

the minimum value=a minimum serial number in the serial number management buffer−a minimum value allowance range; and the maximum value=a maximum serial number in the serial number management buffer+a total number of empty entries in the serial number management buffer+a maximum value allowance range.

5. The packet reception apparatus of claim 4, wherein the processor stores the serial number of the received packet in one of the empty entries of the serial number management buffer when the received packet is classified as the normal packet.

6. The packet reception apparatus of claim 1, wherein, when the serial number management buffer has no empty entry upon the reception of the packet, a minimum value and a maximum value of the serial number allowance range are determined by the following equations:

the minimum value=a minimum serial number in the serial number management buffer;

and the maximum value=a maximum serial number in the serial number management buffer+a maximum value allowance range.

7. The packet reception apparatus of claim 6, wherein the processor replaces one of the serial numbers stored in the serial number management buffer with the serial number of the received packet when the received packet is classified as the normal packet.

8. The packet reception apparatus of claim 7, wherein the processor replaces a smallest serial number among the serial numbers stored in the serial number management buffer with the serial number of the received packet.

9. The packet reception apparatus of claim 1, wherein the processor transmits an error packet to the packet transmission apparatus when the serial number management buffer has stored therein a serial number identical to the serial number of the received packet or the serial number of the received packet falls outside the serial number allowance range calculated from the serial numbers stored in the serial number management buffer.

10. A packet reception method, comprising:
receiving, by a reception module, a packet transmitted from a packet transmission apparatus through a network;
determining, by a determination module, whether a serial number management buffer is full upon reception of the packet;
comparing, by the determination module, a serial number of the received packet with a serial number stored in the serial number management buffer;
classifying, by the determination module, the received packet as a normal packet when the serial number management buffer does not have stored therein a serial number identical to a serial number of the received packet and the serial number of the received packet falls within a serial number allowance range; and
processing, by a processing module, the normal packet;
wherein the serial number allowance range is calculated from a total number of empty entries in the serial number management buffer, and minimum and maximum serial numbers stored in the serial number management buffer based on a result of the determination and includes a serial number which exceeds a maximum serial number in the serial number management buffer, and
wherein, a size of the serial number allowance range is changed based on the total number of empty entries in the serial number management buffer.

11. The packet reception method of claim 10, wherein, when the serial number management buffer has an empty entry upon the reception of the packet, a minimum value and a maximum value of the serial number allowance range are determined by the following equations:

the minimum value=a minimum serial number in the serial number management buffer−a minimum value allowance range; and the maximum value=a maximum serial number in the serial number management buffer+a total number of empty entries in the serial number management buffer+a maximum value allowance range.

12. The packet reception method of claim 11, wherein the classifying of the received packet further comprises storing the serial number of the received packet in one of the empty entries of the serial number management buffer when the received packet is classified as the normal packet.

13. The packet reception method of claim 10, wherein, when the serial number management buffer has no empty entry upon the reception of the packet, a minimum value and a maximum value of the serial number allowance range are determined by the following equations:

the minimum value=a minimum serial number in the serial number management buffer;

and the maximum value=a maximum serial number in the serial number management buffer+a maximum value allowance range.

14. The packet reception method of claim 13, wherein the classifying of the received packet further comprises replacing one of the serial numbers stored in the serial number management buffer with the serial number of the received packet when the received packet is classified as the normal packet.

15. The packet reception method of claim 14, wherein the classifying of the received packet further comprises replacing a smallest serial number among the serial numbers stored in the serial number management buffer with the serial number of the received packet.

16. The packet reception method of claim 10, wherein the classifying of the received packet further comprises transmitting an error packet to the packet transmission apparatus when the serial number management buffer has stored therein a serial number identical to the serial number stored in the serial number management buffer or the serial number of the received packet falls outside the serial number allowance range calculated from the serial numbers stored in the serial number management buffer.

* * * * *